United States Patent [19]
Carrara et al.

[11] Patent Number: 5,478,519
[45] Date of Patent: Dec. 26, 1995

[54] INJECTION-COMPRESSION PROCESS FOR FORMING COMPLEX SHAPED ITEMS OF ELASTOMERIC MATERIAL

[75] Inventors: Mauro Carrara, Viggiú ; Giangaetano Ciolfi, Erba, both of Italy

[73] Assignee: RFT S.p.A., Turin, Italy

[21] Appl. No.: 270,929

[22] Filed: Jul. 5, 1994

[30] Foreign Application Priority Data

Jul. 6, 1993 [IT] Italy .................. TO93A0497

[51] Int. Cl.⁶ .................. B29C 43/14; B29C 43/18
[52] U.S. Cl. .................. 264/267; 264/320; 264/328.2; 264/328.7
[58] Field of Search .................. 264/267, 294, 264/296, 320, 328.2, 328.7, 328.11; 425/555, 575, 576

[56] References Cited

U.S. PATENT DOCUMENTS

| | | | |
|---|---|---|---|
| 3,341,647 | 4/1976 | Aberle | 264/325 |
| 3,950,119 | 9/1967 | Reichenbach | 425/251 |
| 4,006,210 | 2/1977 | Denton | 264/296 |
| 4,219,322 | 8/1980 | Chang et al. | 425/547 |
| 4,321,225 | 3/1982 | Jelinek | 264/267 |
| 4,618,466 | 10/1986 | McGlashen et al. | 264/267 |

FOREIGN PATENT DOCUMENTS

| | | |
|---|---|---|
| 3322343 | 1/1985 | Germany . |
| 490948 | 5/1970 | Switzerland . |
| 2035188 | 6/1980 | United Kingdom . |
| 2053772 | 2/1981 | United Kingdom . |

Primary Examiner—Jill L. Heitbrink
Attorney, Agent, or Firm—Ladas & Parry

[57] ABSTRACT

An injection-compression process for forming curable items of elastomeric material, the process including: an injection stage wherein a bottom half mold is injected by a nozzle with a quantity of fluid elastomeric material of a volume, at injection pressure, greater than that of the impression, the material in excess of the volume of the impression being collected outside the impression, in a recess at the injection nozzle and communicating with the impression; and a molding stage wherein the injection nozzle is replaced in fluidtight manner by an element of the same shape, but without the recess, for compressing the excess material into the impression until it sets.

3 Claims, 2 Drawing Sheets

INJECTION-COMPRESSION PROCESS FOR FORMING COMPLEX SHAPED ITEMS OF ELASTOMERIC MATERIAL

BACKGROUND OF THE INVENTION

The present invention relates to an injection-compression process for forming complex shaped items of elastomeric material, possibly including a metal reinforcing element. In particular, the present invention relates to a process for molding bearing seals.

Items of plastic material may be either injection or compression molded.

When injection molded, a mass of pressurized liquid resin is fed into the mold to fill an impression of the same shape as the item being produced. This method provides for producing even complex shaped items to a good degree of dimensional accuracy; which result, however, depends on maintaining the injection pressure inside the mold cavity, and hence on the injection nozzle remaining in communication with the impression, throughout the time taken for the resin injected into the mold cavity to set.

The above limitation poses no problem when working with thermoplastic resins which are set relatively rapidly by cooling. In the case of an elastomer, on the other hand, wherein cross-linking and setting are achieved relatively slowly by heating in the presence of sulfur compounds (curing), the heat transmitted by conduction between the mold and nozzle would also cure the excess material inside the nozzle, thus resulting in clogging, so that the nozzle must be cooled to keep the material inside it below the curing temperature.

The above method also preferably employs molds with multiple impressions, thus resulting in scrap and a high degree of thermal inertia, and, generally speaking, in the use of complex machines with fairly long operating cycles resulting in low output and high production cost.

In the case of rubber materials, therefore, compression molding is preferred, which enables a reduction in cycle time by the formation of separate feed and molding stations. In this case, in fact, the preformed green material, normally in the form of paste, is introduced at a loading station through which a number of single-impression molds are fed successively, are supplied with the necessary material for the molding operation, and, traveling along conveyor lines, are closed to a predetermined pressure and fed into a heating tunnel for curing. Though highly efficient and cheap to run, compression molding frequently presents technical limitations, due to failure of the green paste to fill highly complex shaped impressions.

For specific production requirements, combined injection-compression processes are known, such as that described in European Patent Application n. 0244783. This relates to the production of contact lenses using a machine with a prewidened mold cavity which is fed at low pressure with a quantity of resin material of a volume greater than that occupied at atmospheric pressure by the finished article, and, until the resin sets, is subjected to controlled pressure for gradually reducing its volume.

Even the above known process, however, presents drawbacks, due to the difficulty in regulating several basic parameters, such as the ratio between the volume injected and the volume of the impression, the time lapse between injection and compression, and the final pressure value. In the course of the above operations, in fact, an appropriately thick, solid outer film must be formed for preventing leakage of the liquid polymer— which would require cleaning of the machine, thus further increasing production time and cost— but which does not impair the finished article due to partial filling of the mold. What is more, though suitable for producing articles such as contact lenses, a prewidened mold cavity whose volume is subsequently reduced is hardly feasible for producing complex shaped articles.

SUMMARY OF THE INVENTION

It is an object of the present invention to provide a process for forming complex shaped items of elastomeric material, designed to overcome the aforementioned drawbacks, and which in particular provides for producing precision items and for minimizing rejects, energy consumption and production time.

According to the present invention, there is provided an injection-compression process for forming curable items of elastomeric material; the process comprising:

an injection stage wherein a fluid elastomeric material is introduced inside a mold impression, of the same shape and volume as the item being produced, by means of an injection nozzle formed by a first movable mold element outwardly defining part of the impression, and in such a manner as to introduce substantially no overpressure into the fluid material; and a molding stage wherein the injected fluid material is subjected to predetermined pressure until it sets; characterized in that:

(i)—during said injection stage, the mold is injected with a quantity of said fluid material of a volume, at the injection pressure, greater than that of the impression; the material in excess of the volume of the impression being collected outside the impression in a recess formed at the injection nozzle, in said first movable mold element, and communicating with the impression;

(ii)—during said molding stage, said first movable element with the injection nozzle is removed and replaced by a second movable mold element of the same shape but without said recess, and by which at least part of the as yet fluid excess material is compressed in fluidtight manner into the impression.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
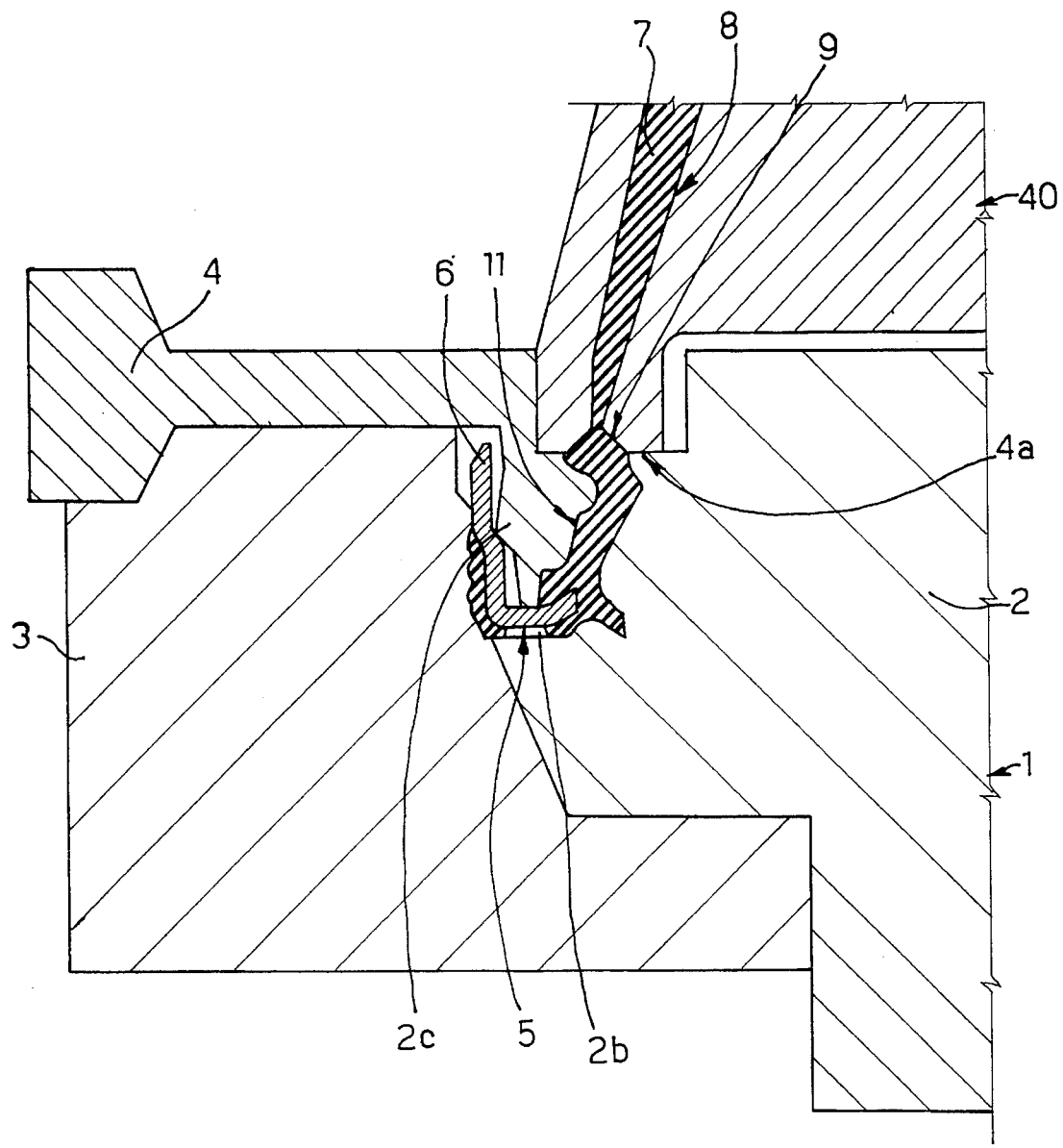
FIG. 1 shows the initial injection stage of the injection-compression process according to the present invention.

Number 1 in FIG. 1 relative to the injection stage indicates a bottom half mold shown in cross section, formed by the union of two bodies 2, 3, and connected in known manner to a top half mold 4 to form a closed cavity or impression 5 of the same outer shape and size as the item being produced, and inside which, in use, are introduced a possible metal insert 6, and resinous fluid material 7 for molding into the shape of impression 5.

According to the present invention, fluid material 7 is injected in known manner into impression 5 at low pressure, i.e. with substantially no overpressure in relation to the atmospheric pressure outside impression 5, through an injection nozzle 8 formed through top half mold 4—in the example shown, inside a movable mold element 40 forming an integral part of but connected removably to half mold 4. Movable mold element 40 is so formed as to define at least part of impression 5, and presents a surface 4a contacting and mating with the rest of half mold 4, facing and partly defining impression 5, and which, according to the present invention, presents a recess 9 formed at injection nozzle 8 and communicating hydraulically with the inside of impression 5. Recess 9 thus provides for containing a predetermined quantity of fluid material 7 injected through nozzle 8 and in excess of the volume of impression 5.

Figure 3:
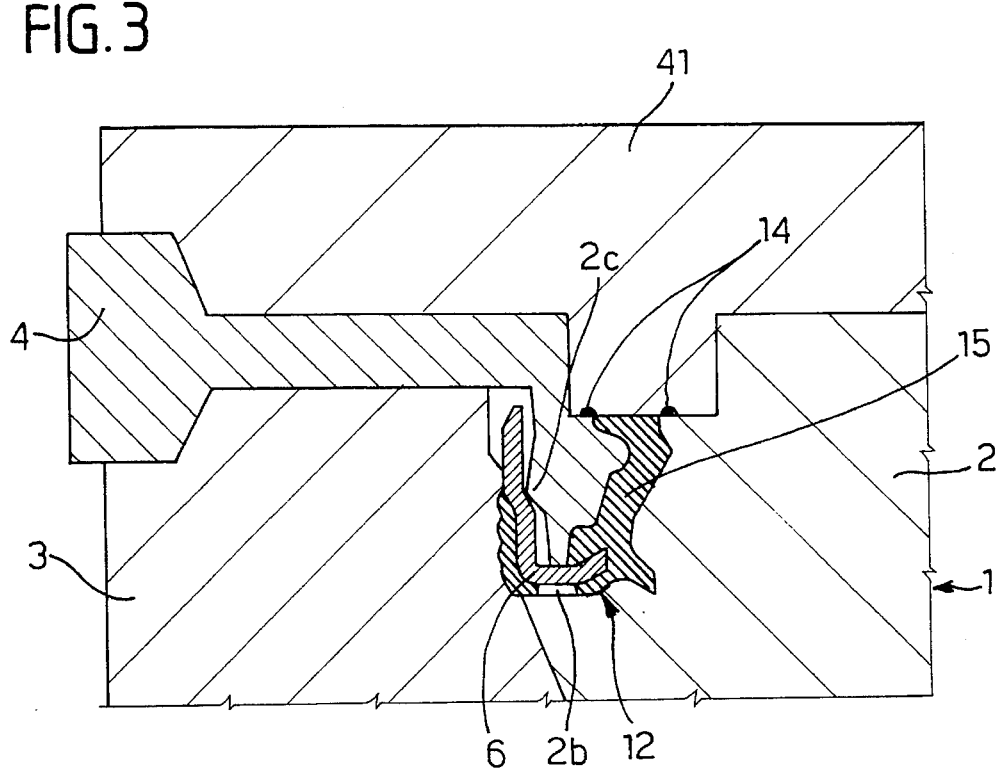
FIG. 3 shows the final molding stage of the injection-compression process according to the present invention.

If the item being produced is a seal or airtight shield as indicated by 12 in FIG. 3, prior to closing impression 5 by placing half mold 4 on top of bottom half mold 1, impression 5 is fitted inside with a metal insert 6 resting on supports 2b in element or body 2, and which, when half molds 1 and 4 are closed, is wedged by a projection 2c on body 2 against the adjacent body 3 of half mold 1, to define, inside impression 5, a closed fluidtight volume 11 communicating with nozzle 8 and recess 9, of exactly the same shape and volume as seal 12 being produced, and defining the actual mold impression.

According to a further characteristic of the present invention, in addition to movable element 40, top half mold 4 also comprises a second movable element 41 (FIGS. 2 and 3) of exactly the same shape as element 40 but without injection nozzle 8 and recess 9. Movable element 40 is removed from half mold 4 and replaced by element 41, so as to define, in lieu of element 40, part of impression 5 (i.e. in the case of a seal as shown by way of example, part of the smaller volume or actual impression 11). Element 41 therefore presents a flat surface 4a facing impression 5 and designed to mate, substantially in fluidtight manner as regards the part not defining impression 5, with a corresponding mating surface 2a defined partly by body 2 of bottom half mold 1, and partly by a portion 13 of half mold 4, insertable between bodies 2 and 3 and which, together with bodies 2 and 3 and surface 2a, defines impression 5.

On either side of the portion of impression 5 facing it, surface 4a preferably presents grooves 14 which, in use, are positioned facing and contacting surface 2a, but immediately adjacent to impression 5 (FIG. 3). When element 40 is replaced by element 41, grooves 14 are so sized and located as to define, inside mated half molds 1 and 4, recesses of a much smaller volume (e.g. one tenth) as compared with recess 9 in element 40 and located adjacent to, but not communicating with, impression 5.

Figure 2:
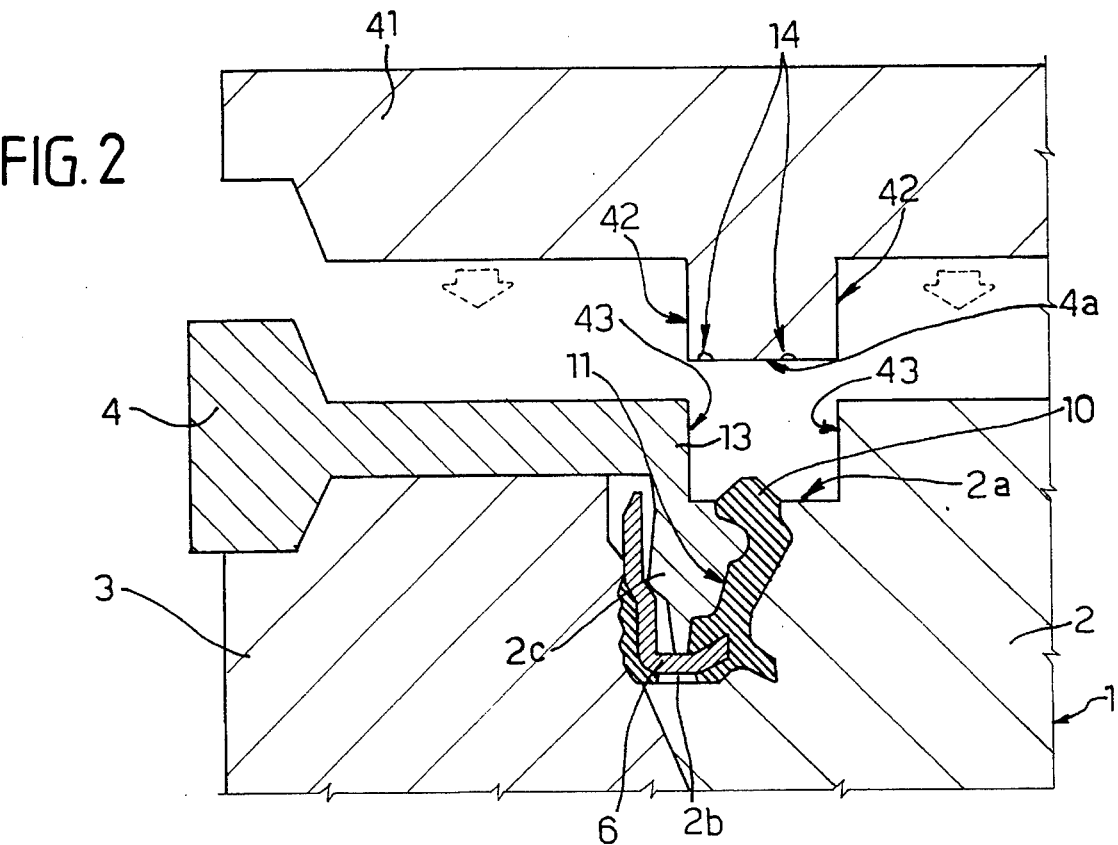
FIG. 2 shows an intermediate stage following the FIG. 1 stage.

As shown clearly in FIGS. 1, 2 and 3, the process according to the present invention comprises various stages. Firstly (FIG. 1), bottom half mold 1 is composed by mating bodies 2 and 3; and, after first placing insert 6 (if any) on supports 2b, top half mold 4 is placed on top of half mold 1 by inserting portion 13 between bodies 2 and 3, and placing element 40 with injection nozzle 8 on top of the resulting whole, with surface 4a contacting surface 2a of bottom half mold 1. At this point (FIG. 1), moldable fluid material 7, consisting in the example shown of a curable fluid elastomeric composition, is injected in such a manner as to introduce into fluid material 7, as it is injected gradually into impression 5, substantially no overpressure in relation to the pressure outside impression 5, and in such a manner as to inject, into the mold defined by half molds 1 and 4, a quantity of fluid material 7 of a volume, at injection pressure, greater by a predetermined amount as compared with the volume of impression 5. According to the present invention, the predetermined excess material, indicated 10 in FIG. 2, is collected outside impression 5—in the example shown, inside recess 9 which is therefore formed of the appropriate volume.

The injection stage is followed by a compression molding stage wherein the injected fluid material 7 is compressed at a predetermined pressure in excess of atmospheric pressure, and at the same time is heated, e.g. by directly or indirectly heating half molds 1 and 4, to cure and so cause cross-linking and setting of the material. During this stage, material 7, as cross-linking occurs, also adheres to possible metal insert 6 which is normally retained in known manner by means of a primer or other polymerizable paint or bonding agent which cross-links together with material 7 to ensure firm adhesion of material 7, when set, to insert 6.

As shown in FIGS. 2 and 3, the compression molding stage is performed by removing movable element 40 with injection nozzle 8 and replacing it with second movable element 41 of exactly the same shape but without recess 9. This involves temporarily opening the mold (FIG. 2), and is made possible by the injection stage being performed without introducing any significant overpressure into the fluid material 7 (in paste form) injected into impression 5, i.e. by injecting the material at no more than the pressure strictly necessary to overcome the hydraulic load losses incurred as material 7 is fed through nozzle 8 and out into impression 5. As such, when element 40 is removed, the predetermined quantity 10 of fluid material 7 injected in excess of the predetermined volume of impression 5, and which was formerly housed inside recess 9, is exposed to form a bulge of material 7 on surface 2a (FIG. 2), and no backflow of material 7 occurs outwards of impression 5.

Upon removal of element 40, this is replaced by element 41, the surface 4a of which, as it is inserted between bodies 2 and 3, acts on portion 10 of fluid material 7 on surface 2a so as to force it gradually into impression 5 in fluidtight manner (as element 41 is inserted inside half molds 1 and 4, the lateral walls 42 of element 41 cooperate in fluidtight manner with respective lateral walls 43 of body 2 and portion 13 of half mold 4 to prevent material 7 from flowing outwards of half molds 1 and 4). As impression 5 is already substantially filled with the fluid material 7 injected previously with no overpressure, the insertion of excess portion 10 compresses the previously injected material and so pressurizes impression 5 to a predetermined value (depending on the volume of excess portion 10 of material 7, and the volume of impression 5).

In other words, when element 41 is fully inserted (FIG. 3) with surface 4a defining impression 5 and positioned contacting and flush with surface 2a of the bottom portion of the mold, impression 5 contains a quantity of fluid elastomeric material 7 of a volume, at injection pressure, greater than the volume of impression 5 itself, and which is therefore compressed inside impression 5 with a given overpressure. The injected fluid material 7 forced inside a smaller volume therefore fills any gaps left during injection of impression 5, e.g. due to the particularly complex shape of the impression; and a very small amount of material which may possibly escape laterally towards walls 42, 43 during compression is collected and retained inside grooves 14.

The mold so formed, with impression 5 pressurized and sealed by element 41, and containing substantially all the injected material, is then transferred in known manner to a known curing station (not shown) where cross-linking of the injected material is achieved by heating the mold to a temperature higher than the curing temperature of material 7, to form the finished item 12. Any material inside grooves 14 also sets in the form of scrap.

The process according to the present invention therefore provides for overcoming all the drawbacks typically associated with known methods, as well as for affording the following advantages:

injecting the material at low pressure simplifies the injection system as well as enabling energy saving;

molding a quantity of resinous material in excess of the actual working volume provides for accurately filling the entire mold cavity, thus ensuring superior technical results and fine quality of even complex shaped items;

separating the injection and compression molding operations into physically separate stages provides for two advantages: organizing production on a conveyor line basis, for drastically reducing cycle time and so increasing output; and technically simplifying the process, by virtue of the material setting in the absence of the injection nozzle;

reducing the cycle time enables the use of small single molds with a low thermal capacity, i.e. for reducing energy costs for heating during the curing stage;

the geometry of the mating surfaces provides for effectively reducing scrap.

Clearly, changes may be made to the process as described and illustrated herein without, however, departing from the scope of the present invention.

We claim:

1. An injection-compression process for forming a complex item of precise shape of curable elastomeric material said process comprising:

a. preselecting an amount of fluid elastomeric material so that when said material is injected into a mold impression of size and shape of the item to be produced there is an excess of fluid elastomeric material that is collected outside said mold impression in a recess formed between an injection nozzle and said mold impression, said injection nozzle formed by a first movable mold element outwardly defining part of the mold impression, b. injecting fluid elastomeric material inside the mold impression by means of the injection nozzle, the fluid elastomeric material being injected so that substantially no overpressure is introduced into the fluid elastomeric material;

c. molding said fluid material by allowing the fluid material to set by applying a predetermined pressure in excess of atmospheric pressure and heat removing the first movable element with the injection nozzle during the molding while the injected material has not been completely set and is still fluid and replacing the first movable element with a second movable mold element of substantially the same shape as the first movable element, said second movable mold element lacking a recess, said second movable mold element compressing the excess of fluid elastomeric material into the mold impression, d. said second movable element provided with to the side of and immediately adjacent to said mold impression, grooves for receiving a part of the fluid material in excess of the fluid elastomeric material that has not been compressed in step c. into the mold impression, said grooves being of a much smaller volume than the volume of the recess of the first movable element, and said grooves being located adjacent to but not communicating with said portion of the mold impression and e. curing the elastomeric material.

2. The process according to claim 1 wherein during the molding of step c. the fluid elastomeric material is heated to a temperature higher than its curing temperature.

3. The process according to claim 1 wherein before the fluid elastomeric material is injected into the mold impression, a metal insert is inserted into the mold impression to define a portion of said mold impression, said portion being of the size and shape of the item produced.

\* \* \* \* \*